ured Nov. 29, 1966

3,288,763
ALKYL HALIDES IN VULCANIZATION OF ELASTOMERS

Thomas Fredrick Waldron, Hillsborough Township, Somerset County, N.J., assignor to American Cyanamid Company, Stamford, Conn., a corporation of Maine
No Drawing. Filed June 4, 1963, Ser. No. 285,201
14 Claims. (Cl. 260—79.3)

This invention is concerned with an improved curing procedure for synthetic, rubber-like, vulcanizable, elastomeric copolymers containing active halogen. More particularly, this invention contemplates the use of a novel combination of curing agents for such elastomers; to the compounding of the latter into vulcanizable compositions; to the vulcanization thereof; and to the resultant products, both vulcanizable and vulcanized.

Still more specifically, the invention relates to the use in curing such elastomers of the combination of an alkyl halide or an alkylene dihalide with an ammonium salt of a weak acid.

Halogen-containing elastomers with which the present invention is concerned include several different commercially-available types. Chlorine is the most commonly active halogen and will be used in this discussion as illustrative.

One class of such elastomers includes copolymers which comprise in major proportion a polymerized lower alkyl acrylate and in minor proportion a coplymerized monomer containing the active halogen. Herein, accordingly, the term "acrylate elastomers" is used to designate such polymers and copolymers.

Another class of active-halogen containing elastomers which may be cured in accordance with the present invention is often referred to as "polychloroprene" polymers. As used herein the term "polychloroprene" includes not only polymers of "chloroprene" (2-chloro-1,3-butadiene), but also copolymers thereof with polymerizable vinyl or diene compounds wherein chloroprene is the predominant monomer.

Still further types of active chlorine-containing elastomers which may be cured in the vulcanization process of this invention include, for example, chlorinated butyl rubber; and polymers of chlorinated and/or chlorosulfonated polyethylene.

Such elastomers are of particular interest because of their outstanding resistance to deterioration due to heat. They perhaps have the best such properties of all commercial rubbers, except for some silicones and some highly-fluorinated elastomers made for special applications. They are also highly resistant to flexural breakdown, compression set, ozone, ultraviolet light, mineral oils and gas diffusion. They have been recommended and widely used in gaskets, hose, conveyor belts, valve seats, packings, oil seals, printing rolls, protective coatings, transformer leads, electrical insulation and the like.

Specialty elastomers based on polymers of alkyl acrylates were introduced to the trade many years ago. Ethyl acrylate, being the most commonly used ester, will be taken as illustrative. Such polyacrylic esters do contain reactive groups which can be used for vulcanization with some special recipes. Unfortunately, the number of such recipes and thus the opportunity for preparing vulcanizates of different types and properties are limited. For this reason, much attention has been given to preparing polyacrylates having reactive functional groups that facilitate vulcanization.

Such functional groups have been introduced by copolymerizing ethyl acrylate with variable amounts of a suitable copolymerizable monomer containing the desired group. Perhaps the most used and generally-preferred elastomers have comprised copolymers of ethyl acrylate with varying amounts of a copolymerizable chlorine-containing monomer such as 2-chloroethyl vinyl ether; 2-chloroethyl acrylate; vinyl chloroacetate and the like. Polychloroprenes and other elastomers are equally known and available.

Various agents previously have been used or suggested for the curing of acrylate and other active chlorine-containing elastomers. Therein, reactive halogen atoms facilitate vulcanization if a suitable crosslinking agent is used. Among the curing agents which have been suggested are ammonia and various primary and secondary amines.

Unfortunately, for most purposes, ammonia and amines are too fast reacting as curing agents, causing agents, causing premature curing and scorching. Particularly is this true of the newer elastomeric copolymers of ethyl acrylate and vinyl chloroacetate. The elastomers, with which this invention is concerned, when formulated, are largely used for making molded shapes. It is highly important they be capable of flow into a hot mold without premature curing.

It is, therefore, one major object of this present invention to provide a curing agent for "acrylate" and "non-acrylate" halogen-containing elastomers which will permit:

(1) Process safety during compounding of the elastomeric stock;
(2) Good shelf life of the compounded stock;
(3) Good flow of elastomer into the hot mold, prior to curing;
(4) Adequately short curing cycles or fast rates of cure;
(5) The use both of medium and of high curing temperatures; and
(6) Cured elastomers of better appearance and physical properties.

As shown in my copending application for United States Letters Patent, Serial No. 285,200, filed of even date, this object is accomplished to a successful degree by the use of ammonium salts of weak acids. In the present invention it is unexpectedly found that still further improvements are obtained by using the same salts in combination with a suitable alkyl halide or dialkylene halide.

While it might be excepted that a combination of certain ammonium salts and an alkyl halide would be equivalent to the use of an amine, as previously proposed, such a result does not occur. Whatever the mechanism of the present curing process may be, use of the reagent combination of the present invention unexpectedly results in greater processing safety.

In contract with the use of previously-proposed curing agents which permitted the user only a limited time to compound the elastomer before scorching occurred: use of the novel combination of ammonium salts and alkyl halides of the invention allows ample processing time. At temperatures below curing temperature ranges, the agents are stable and permit processing safety. The compounded elastomers are readily flowed into the mold before curing occurs. However, at the temperatures ordinarily used for curing (usually above 150° C.) the ammonium salt-alkyl halide combination of this invention does produce rapid curing. Resultant shortened vulcanization times enable a manufacturer to produce more finished articles per unit of available machine time and thereby reduce his operating costs.

A further advantage of the present invention is in the utilization of readily available ammonium salts of weak acids. Useful salts include, for example, ammonium acetate, ammonium carbonate, ammonium benzoate, ammonium propionate, ammonium stearate, ammonium vanadate, ammonium terephthalate and the like. It will be noted that salts of inorganic and organic acids, including both mono- and polybasic acids, are contemplated. They may be salts of almost any acid having a pKa value of above about three and preferably above about four. Mixtures of salts also may be used.

Broadly, useful concentrations of ammonium salt in the compounded elastomer may range from as little as about one to as high as about twenty parts per 100 parts of elastomer. However, good general practice will be found to employ from about two to about ten parts per 100 and this is the generally preferred range.

Useful alkyl halides include both mono and polyhalides, with but one halogen attached to a single carbon atom. The preferred halogens are chlorine and bromine. In such halides, the alkyl moiety may contain from about two to about twenty carbon atoms. Typical illustrative halides include, for example, butyl bromide, hexyl bromide, dodecyl bromide, and octadecyl bromide, and alkylene dihalides such as 1,2-dibromoethane (ethylene dibromide), 1,4-dichlorobutane (tetramethylene dibromide) and alpha, beta-dibromostyrene (styrene dibromide). Useful concentrations of alkyl halide in the compounded elastomer may range from as little as one to as high as about twenty-five parts per 100 parts of elastomer.

It is often advantageous, but not necessary, to use a small amount of magnesium oxide with the ammonium salt. Magnesium oxide by itself will not adequately cure the elastomer. However, when some 0.05 to five parts per 100 parts of elastomer are used with the ammonium salt, magnesia does accelerate the rate of cure and reduce the amount of corrosion experienced by the compounding and curing equipment.

Standard compounding procedures are used for incorporating into the elastomer the ammonium salt; the alkyl halide; the magnesia, if used; and the other compounding ingredients. In general, curing temperatures above 150° C. are recommended. Otherwise no changes in the known curing practice are required.

The invention will be further illustrated in conjunction with the following examples. Therein, unless otherwise noted, all parts and percentages are by weight and all temperatures are in degrees centigrade.

*Example 1*

Three masterbatches A, B and C were prepared; each containing 100 parts of 97.5/2.5 ethyl acrylate/vinyl chloroacetate elastomer, 50 parts of SRF* carbon black and 2 parts of stearic acid. Each masterbatch was milled on a rubber mill with 8.0 parts of ammonium benzoate and the amount of the alkyl halide shown below in Table I. Milling was continued for 15 minutes at a temperature of from 50° to 80° C. The scorch time for each batch was determined at 121° C. Each compounded batch was placed in a mold and cured for 10 minutes under pressure at a temperature of 165° C. Resultant cured elastomers then were conditioned at 150° C. for 24 hours and their physical properties then determined. Illustrative results are shown in the following Table I.

* SRF="Semi-reinforcing furnace black."

TABLE I

|  | Batch A | Batch B | Batch C |
|---|---|---|---|
| Alkyl halide | Butyl bromide. | Hexyl bromide. | Dodecyl bromide. |
| Amount of halide (parts) | 3.6 | 4.5 | 4.7. |
| Scorch time (min.) | 14.0 | 15.0 | 17.0. |
| Tensile strength, (p.s.i.) | 1,600 | 1,650 | 1,550. |
| Elongation, (percent) | 270 | 260 | 260. |
| Modulus, 200%, (p.s.i.) | 1,225 | 1,225 | 1,025. |
| Hardness, (Shore A) | 60 | 61 | 61. |

*Example 2*

Two masterbatches D and E were prepared by the procedure of Example 1. Each then was milled on a rubber mill with 8.2 parts of ammonium benzoate, 0.5 part of magnesium oxide and the amount and kind of alkylene dihalide shown in Table II. The elastomer mixes were cured in molds under pressure at 170° C. for five minutes and the resultant cured elastomers then were conditioned at 150° C. for 24 hours. Physical properties of the so-cured elastomers are shown in the following Table II.

TABLE II

|  | Batch D | Batch E |
|---|---|---|
| Alkylene dihalide | 1,2-dibromoethane | 1,4-dichlorobutane. |
| Amount of halide (parts) | 10.0 | 6.5. |
| Scorch time 121° C. (min.) | 13.7 | 13.5. |
| Tensile strength, p.s.i. | 1,625 | 2,075. |
| Elongation, percent | 230 | 100. |
| Modulus, 200%, p.s.i. | 1,475 |  |
| Hardness, Shore A | 61 | 87. |

*Example 3*

The masterbatch of Example 1 was milled on a rubber mill with 4.0 parts of ammonium acetate and 2.3 parts of dodecyl bromide. The elastomer mix was cured in a mold at 165° C. for 10 minutes, followed by a 24-hours conditioning period at 150° C. The vulcanizate had the following properties:

TABLE III

| Tensile strength, p.s.i. | 1275 |
|---|---|
| Elongation, percent | 310 |
| Modulus, 300%, p.s.i. | 675 |
| Hardness, Shore A | 52 |

*Example 4*

A masterbatch was prepared containing 100 parts of an ethyl acrylate/vinyl chloroethyl ether elastomer, 50 parts of SRF carbon black and 2 parts of stearic acid. The masterbatch was milled on a rubber-mill with 3.5 parts of ammonium acetate, 8.6 parts of 1,2-dibromoethane and 0.5 part of magnesium oxide at a temperature of 50°–80° C. for 15 minutes. The elastomer mix was cured in a mold at a temperature of 165° C. for 30 minutes. The vulcanizate had the following properties.

TABLE IV

| Tensile strength, p.s.i. | 1025 |
|---|---|
| Elongation, percent | 510 |
| Modulus, 300%, p.s.i. | 550 |
| Hardness, Shore A | 48 |

*Example 5*

Two masterbatches were prepared according to the procedure of Example 1. Each masterbatch was milled with 2.3 parts of dodecyl bromide and the amount of ammonium benzoate shown in Table VI. When elastomer Mix A was heated at 165° C. there was no increase in viscosity indicating that curing had not taken place. Elastomer Mix B was cured in a mold under pressure at 165° C. for 10 minutes, followed by a conditioning period of 24 hours at 150° C. The physical properties of Elastomer B are shown in Table V.

TABLE V

|  | A | B |
|---|---|---|
| Ammonium benzoate | None | 4.0 |
| Tensile strength, p.s.i. |  | 1,400 |
| Elongation, percent |  | 240 |
| Modulus, 200%, p.s.i. |  | 1,075 |
| Hardness, Shore A |  | 55 |

Example 6

Three masterbatches F, G and H were prepared each containing 100 parts of 97.5/2.5 ethyl acrylate/vinyl chloroacetate elastomer, 50 parts of the kind of carbon black shown in Table V, and 2 parts of stearic acid. Each batch was milled with the amounts of ammonium benzoate and dodecyl bromide and magnesium oxide shown in Table V. The elastomer mixtures were cured in molds under pressure at the temperature and for the length of time shown in Table V. After a conditioning period of 24 hours at 150° C., the physical properties of the vulcanizates were determined as shown below.

TABLE VI

|  | Batch F | Batch G | Batch H |
|---|---|---|---|
| Carbon black | [1] HAF | [2] ISAF | SRF |
| Ammonium benzoate | 6.0 | 4.0 | 4.6 |
| Dodecyl bromide | 3.6 | 4.9 | 2.3 |
| Magnesium oxide |  | 0.7 | 0.088 |
| Scorch time, 121° C., (min.) | 25.5 | 15.5 | 15.8 |
| Cure temp. (° C.) | 165 | 165 | 162 |
| Cure time, (min.) | 8 | 8 | 12.5 |
| Tensile strength (min.) | 2,300 | 2,375 | 1,775 |
| Elongation (percent) | 230 | 190 | 220 |
| Modulus, 200% (p.s.i.) | 2,175 |  | 1,650 |
| Modulus, 100% (p.s.i.) |  | 1,225 |  |
| Hradness (Shore A) |  | 70 | 81 | 62 |

[1] High Abrasion Furnace Black.
[2] Intermediate Super Abrasion Furnace Black.

Example 7

Four masterbatches I, J, K and L were prepared each containing 100 parts of 97.5/2.5 ethyl acrylate/vinyl chloroacetate elastomer, 50 parts of the type of carbon black shown below in Table VII and 2 parts of stearic acid. Each masterbatch was milled with the amount of ammonium benzoate, dodecyl bromide and magnesium oxide shown in Table VII. The elastomer mixes were cured in molds at the temperature and for the length of time shown in Table VII, followed by a conditioning period of 24 hours at 150° C. The properties of the vulcanizates are shown in Table VII.

TABLE VII

|  | Batch I | Batch J | Batch K | Batch L |
|---|---|---|---|---|
| Carbon black | [1] SRF | [1] SRF | [2] FEF | [2] FEF |
| Amm. benzoate (parts) | 6 | 6 | 3 | 3 |
| Dodecyl bromide (parts) | 0 | 3.6 | 0 | 2.3 |
| Mag. oxide (parts) | 0.088 | 0.088 | 0.5 | 0.5 |
| Cure time (min.) | 10 | 10 | 15 | 15 |
| Cure temperature (° C.) | 165 | 165 | 205 | 205 |
| Tensile strength, p.s.i. | 1,300 | 1,550 | 1,600 | 1,875 |
| Elongation, percent | 310 | 210 | 190 | 140 |
| Modulus, 200%, p.s.i. | 800 | 1,475 |  |  |
| Modulus, 100%, p.s.i. |  |  | 1,050 | 1,525 |
| Hardness, Shore A | 49 | 54 | 70 | 74 |

[1] Semi-Reinforcing Furnace Black.
[2] Fast Extruding Furnace Black.

As was discussed above, use of primary and secondary amines as curing agents has been previously proposed. It might be expected that use of the ammonium salt with an alkyl halide would be equivalent thereto. However, this is not the case in fact. To illustrate this point the following example was carried out.

Example 8

To illustrate the decrease in required cure time when using $\alpha,\beta$-dibromostyrene, two masterbatches (M and N) were prepared by the procedure of Example 1. Each masterbatch was milled with 3.0 parts of ammonium benzoate and 0.25 part of magnesium oxide. Into one batch (N) was also milled 2.9 parts of $\alpha,\beta$-dibromostyrene. The elastomer mixes were cured in molds under pressure at a temperature of 165° C. for the time shown in Table VIII, followed by a conditioning period of 24 hours at 150° C.

TABLE VIII

|  | M | N |
|---|---|---|
| Curing time (minutes) | 10 | 8 |
| Tensile strength (p.s.i.) | 1,600 | 1,850 |
| Elongation (%) | 250 | 190 |
| Hardness (Shore A) | 58 | 63 |

Example 9

A masterbatch (O) was prepared containing 100 parts of 97.5/2.5 ethyl acrylate/vinyl chloroacetate elastomer, 50 parts of FEF carbon black and 2 parts of stearic acid. The masterbatch was milled with 3.0 parts of diammonium adipate and 2.0 parts of dodecyl bromide. The scorch time of the compounded elastomer was determined at 121° C. The elastomer mix was cured in a mold at a temperature of 165° C. for 7 minutes, followed by a conditioning period of 16 hours at 150° C. Results are summarized in Table IX.

TABLE IX

| | |
|---|---|
| Scorch time, minutes | 11.5 |
| Tensile strength, p.s.i. | 1900 |
| Elongation, percent | 120 |
| Hardness, Shore A | 75 |

Example 10

A masterbatch (P) was prepared containing 100 parts of Hypalin-20 (a chlorosulfonated polyethylene elastomer which contains 1.3% sulfur and 29.0% chlorine), 50 parts of SRF carbon black and 2 parts of stearic acid. The masterbatch was milled on a rubber mill with 4.0 parts of ammonium benzoate, 2.3 parts of dodecyl bromide and 0.25 part of magnesium oxide at a temperature of 50°–80° C. for 15 minutes. The elastomer mix was cured at a temperature of 165° C. for 7 minutes, followed by a conditioning period of 24 hours at 150° C. Results are illustrated in Table X.

TABLE X

| | |
|---|---|
| Tensile strength, p.s.i. | 2000 |
| Elongation, percent | 280 |
| Modulus, 200% | 1775 |
| Hardness, Shore A | 65 |

Example 11

A masterbatch (Q) was prepared containing 100 parts of Neoprene W (a non-sulfur-modified general purpose type of polychloroprene elastomer) and 50 parts of carbon black. The masterbatch was milled on a rubber mill with 2 parts of N-phenyl-beta-naphthylamine, 3 parts of ammonium benzoate, 2.3 parts of dodecyl bromide and 0.25 part of magnesium oxide at a temperature of 50°–80° C. for 15 minutes. The elastomer mix was cured at a temperature of 165° C. for 7 minutes. The vulcanizate has the following properties.

TABLE XI

| | |
|---|---|
| Tensile strength, p.s.i. | 1000 |
| Elongation, percent | 320 |
| Modulus, 200% | 550 |
| Hardness, Shore A | 61 |

Example 12

A masterbatch (R) is prepared by the procedure of Example 4. The masterbatch is milled on a rubber mill with 6.0 parts of ammonium benzoate and 5.5 parts of dodecyl bromide. The elastomer mix is cured in a mold at a temperature of 165° C. for 60 minutes. The vulcanizate has the following properties.

TABLE XII

| | |
|---|---|
| Tensile strength, p.s.i. | 700 |
| Elongation, percent | 810 |
| Modulus, 300%, p.s.i. | 275 |
| Hardness, Shore A | 39 |

*Example 13*

A masterbatch (S) is prepared by the procedure of Example 11. The masterbatch is milled on a rubber mill with 4.0 parts of ammonium benzoate, 2.3 parts of dodecyl bromide and 0.25 part of magnesium oxide. The elastomer mix is cured at a temperature of 165° C. for 7 minutes. No conditioning period after the cure is used. The vulcanizate has the following properties.

TABLE XIII

| | |
|---|---|
| Tensile strength, p.s.i. | 1750 |
| Elongation, percent | 460 |
| Modulus, 200%, p.s.i. | 900 |
| Hardness, Shore A | 56 |

*Example 14*

A masterbatch (T) is prepared containing 100 parts of Neoprene W (see Example 12), 50 parts of SRF carbon black and 2 parts of stearic acid. The masterbatch is milled on a rubber mill with 3.0 parts of ammonium benzoate, 2.3 parts of dodecyl bromide and 2.0 parts of phenyl-beta-naphthylamine (PBNA). The elastomer mix is cured at 165° C. for thirteen minutes. The vulcanizate has the following properties.

TABLE XIV

| | |
|---|---|
| Tensile strength, p.s.i. | 1000 |
| Elongation, percent | 320 |
| Modulus, 300%, p.s.i. | 525 |
| Hardness, Shore A | 80 |

I claim:

1. In the compounding and curing of a rubber stock from a synthetic, rubber-like, vulcanizable, active-halogen containing elastomeric polymer; the improvement which comprises: during said compounding, distributing through said polymer in combination (a) from about one to about twenty parts per 100 parts of copolymer of at least one ammonium salt of an acid having a pKa value of at least three and (b) from about one to about 25 parts per 100 parts of copolymer of at least one halide selected from the group consisting of the alkyl and alkylene halides wherein the alkyl moiety contains from about two to about twenty carbons.

2. A process according to claim 1 in which said elastomeric polymer is a copolymer of an alkyl acrylate and vinyl chloroacetate.

3. A process according to claim 1 in which said elastomeric polymer is a copolymer of ethyl acrylate and vinyl chloroacetate.

4. A process according to claim 1 in which said elastomeric polymer is a copolymer of ethyl acrylate and vinyl chloroethyl ether.

5. A process according to claim 1 in which said elastomeric polymer is a chlorosulfonated polyethylene.

6. A process according to claim 1 in which said elastomeric polymer is polychloroprene.

7. A process according to claim 1 in which the curing temperature is above 150° C.

8. A process according to claim 1 in which said acid is benzoic acid.

9. A process according to claim 1 in which said acid is adipic acid.

10. A process according to claim 1 in which said acid is terephthalic acid.

11. A process according to claim 1 in which said alkyl halide is dodecyl bromide.

12. A process according to claim 1 in which said alkyl halide is dodecyl bromide and said acid is benzoic acid.

13. A process according to claim 1 in which said alkyl halide is dodecyl bromide and said acid is adipic acid.

14. A process according to claim 1 in which said alkyl halide is dodecyl bromide and said acid is terephthalic acid.

No references cited.

JOSEPH L. SCHOFER, *Primary Examiner.*

D. K. DENENBERG, *Assistant Examiner.*